(12) United States Patent
Deutsch

(10) Patent No.: US 6,742,913 B2
(45) Date of Patent: Jun. 1, 2004

(54) MOTION ACTIVATED DECORATIVE LIGHT

(76) Inventor: Daniel J. Deutsch, P.O. Box 22023, Lake Buena Vista, FL (US) 32830

( * ) Notice: Subject to any disclaimer, the term of this patent is extended or adjusted under 35 U.S.C. 154(b) by 42 days.

(21) Appl. No.: 10/274,848

(22) Filed: Oct. 21, 2002

(65) Prior Publication Data

US 2003/0142506 A1 Jul. 31, 2003

Related U.S. Application Data

(63) Continuation-in-part of application No. 09/756,458, filed on Jan. 9, 2001, now Pat. No. 6,467,939.

(51) Int. Cl.⁷ .................................................. F21L 4/00
(52) U.S. Cl. ...................... 362/253; 362/84; 362/116; 362/191; 362/205; 362/500; 362/802; 362/806
(58) Field of Search ................................. 362/253, 116, 362/806, 84, 802, 205, 191, 473, 500

(56) References Cited

U.S. PATENT DOCUMENTS

| | | | | |
|---|---|---|---|---|
| 4,847,735 A | * | 7/1989 | Kawasaki ................... 362/473 |
| 5,624,175 A | * | 4/1997 | Gelormino et al. ......... 362/473 |
| 6,070,997 A | * | 6/2000 | Duke et al. .................. 362/500 |
| 6,190,018 B1 | * | 2/2001 | Parsons et al. .............. 362/116 |
| 6,318,879 B1 | * | 11/2001 | Huang ......................... 362/205 |
| 6,334,692 B1 | * | 1/2002 | Hsueh .......................... 362/116 |
| 6,341,874 B1 | * | 1/2002 | Rubin .......................... 362/103 |
| 6,507,468 B1 | * | 1/2003 | Klattenhoff et al. .......... 361/54 |

* cited by examiner

Primary Examiner—Laura K. Tso
(74) Attorney, Agent, or Firm—Allen, Dyer, Doppelt, Milbrath & Gilchrist, P.A.

(57) ABSTRACT

Described is an apparatus for a motion activated decorative light connectable to a predetermined article. A housing connects the light to the article. A power source is positioned within the housing for energizing a light source. A switch is connected to the power source and to the light source so as to energize the light source responsive to motion. The housing comprises a material which allows light from the light source to shine through so that it may be seen by a person observing the moving vehicle, and preferably includes a fluorescent material excited by an LED which emits ultraviolet light. The light may comprise an ornamental shape for forming a visually perceptible light image when the light source is energized.

9 Claims, 7 Drawing Sheets

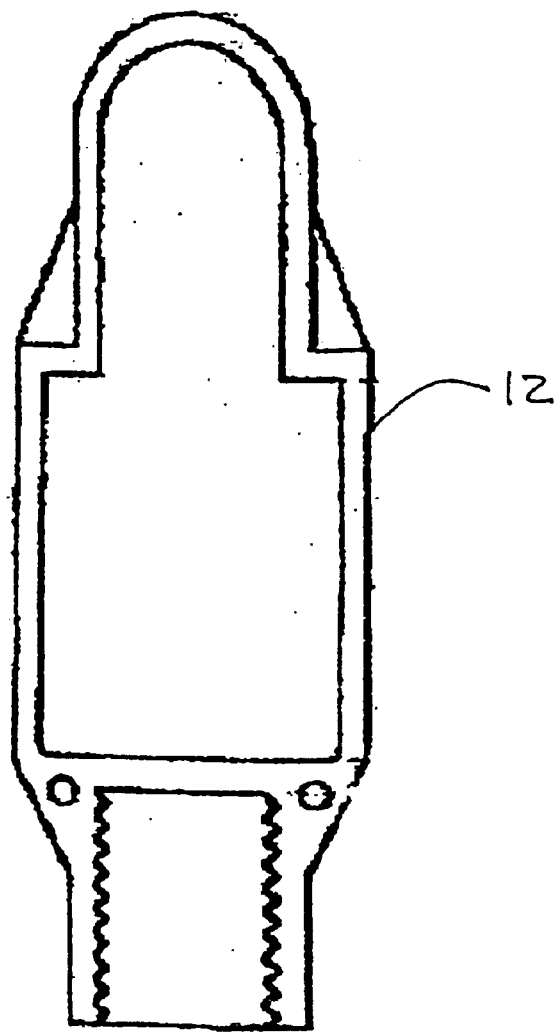
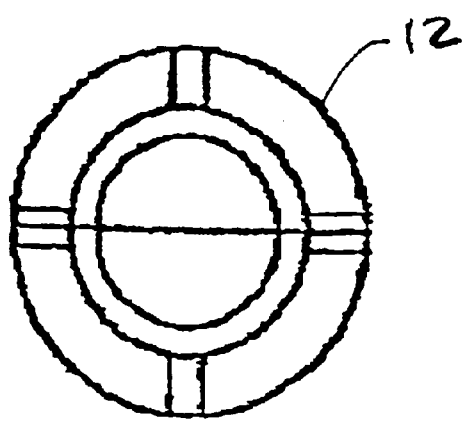
Fig. 3

MOTION ACTIVATED DECORATIVE LIGHT

RELATED APPLICATION

This application is a continuation-in-part of and claims priority from application Ser. No. 09/756,458, which was filed on Jan. 9, 2001 now U.S. Pat. No. 6,467,939, and which is incorporated herein by reference in its entirety.

FIELD OF THE INVENTION

The present invention relates to the field of accessory decorative lights and, more particularly, to a motion activated light structured for connection to a variety of items to be decorated, particularly to a zipper pull.

BACKGROUND OF THE INVENTION

Accessory lights of various kinds have become popular for enhancing the appearance of clothing and utilitarian articles. Some such accessory lights may additionally provide added visibility to the wearer in low light conditions, thereby aiding to increase safety.

Colored lights for lighting the undercarriage of a motor vehicle have also become popular, particularly with younger drivers. Similarly, other known accessory lights for vehicles may be connected to a vehicle wheel for producing a lighting effect on the wheel. Some of these lights, for example, may be suitable for mounting onto wheels on bicycles, motorcycles, automobiles and other motor vehicles.

Accessory lights for mounting on vehicle wheels have been known. Some wheel lights mount onto the spokes of a bicycle wheel. Some lights mount onto the air valve stem of a wheel, but are only reflectors not producing emitted light, or require that they be manually switched on and off. Yet other similar lights for mounting on a tire's air valve stem are energized on contact with the valve stem and remain energized for as long as the battery lasts.

SUMMARY OF THE INVENTION

With the foregoing in mind, the present invention advantageously provides a motion activated wheel light for a vehicle wheel having an air valve stem, and a connector which engages complimentary threads on the wheel light so as to adapt it for connection to many other articles, besides a vehicle wheel.

The present invention advantageously provides a connector for connecting to an automatic wheel light originally intended for use with a wheel's air valve stem. The novel connector allows the wheel light to be connected to a myriad articles, for example, any article having a zipper pull. key chains, decorative necklaces, and others limited only by the mind of the user.

The wheel light energizes responsive to movement of the device, so that the light is off when there is little or no movement, and turns on when the wearer imparts movement to the light or the article to which it is connected. Such operation provides for extended battery life, and avoids the inconvenience of having to manually turn the wheel light on and off. In addition, the wheel light is inexpensive to manufacture and is useful for enhancing the appearance and visibility of an article, or the wearer of the article.

The light preferably comprises a housing having a connector for connecting the light to a predetermined article; a power source positioned within the housing; a light source positioned within the housing and connected to the power source; and a switch positioned within the housing and connected to the power source and to the light source so as to energize the light source responsive to motion.

The housing provides an enclosure for protecting the other components of the light and, preferably, also serves to connect the light to the article, such as a zipper pull. The housing comprises a material which allows light emitted by the light source to shine through so that it may be seen by a person.

The switch is motion activated, and is responsive to motion energy such as vibration. The light source is energized when the switch is activated, thereby lighting the article to which the light is connected.

The light may comprise an ornamental shape for forming a visually perceptible light image when the light source is energized.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 is a cross section view of the housing of the wheel light of FIG.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may, however, be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
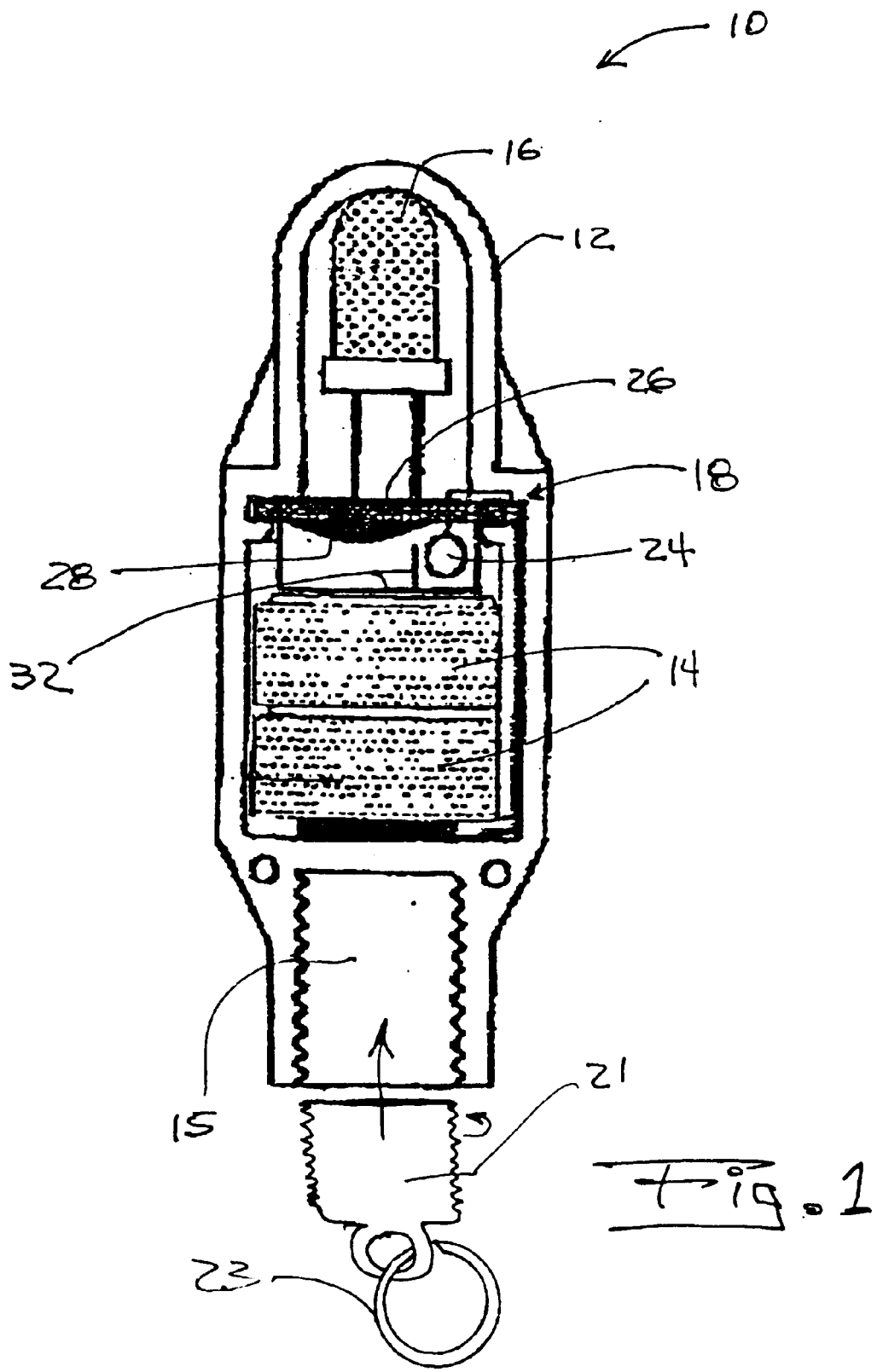
FIG. 1 is a cross section view showing the wheel light according to a preferred embodiment of the present invention.
Figure 4:
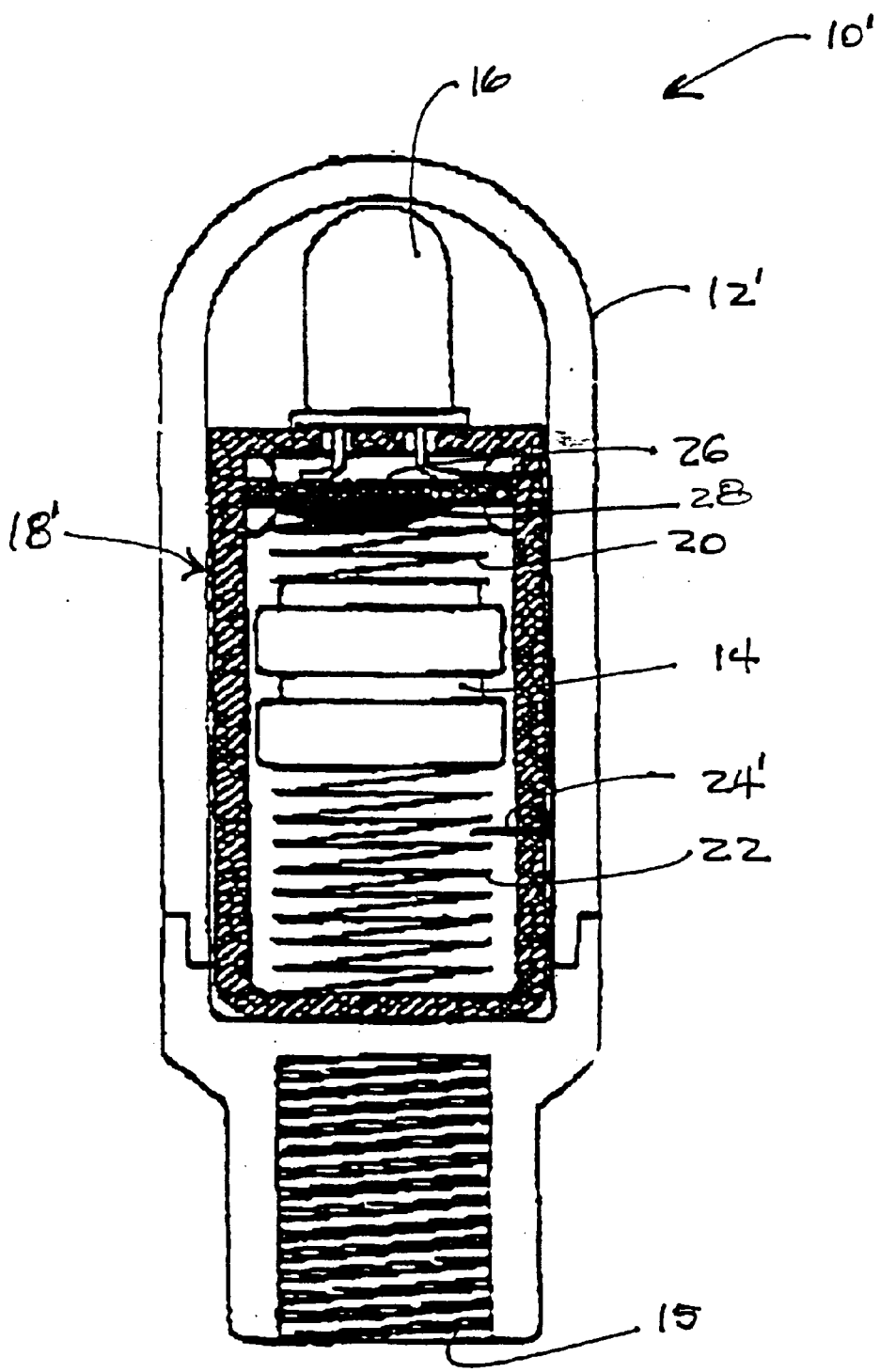
FIG. 4 is a cross section view of an additional embodiment of the invention.
Figure 5:
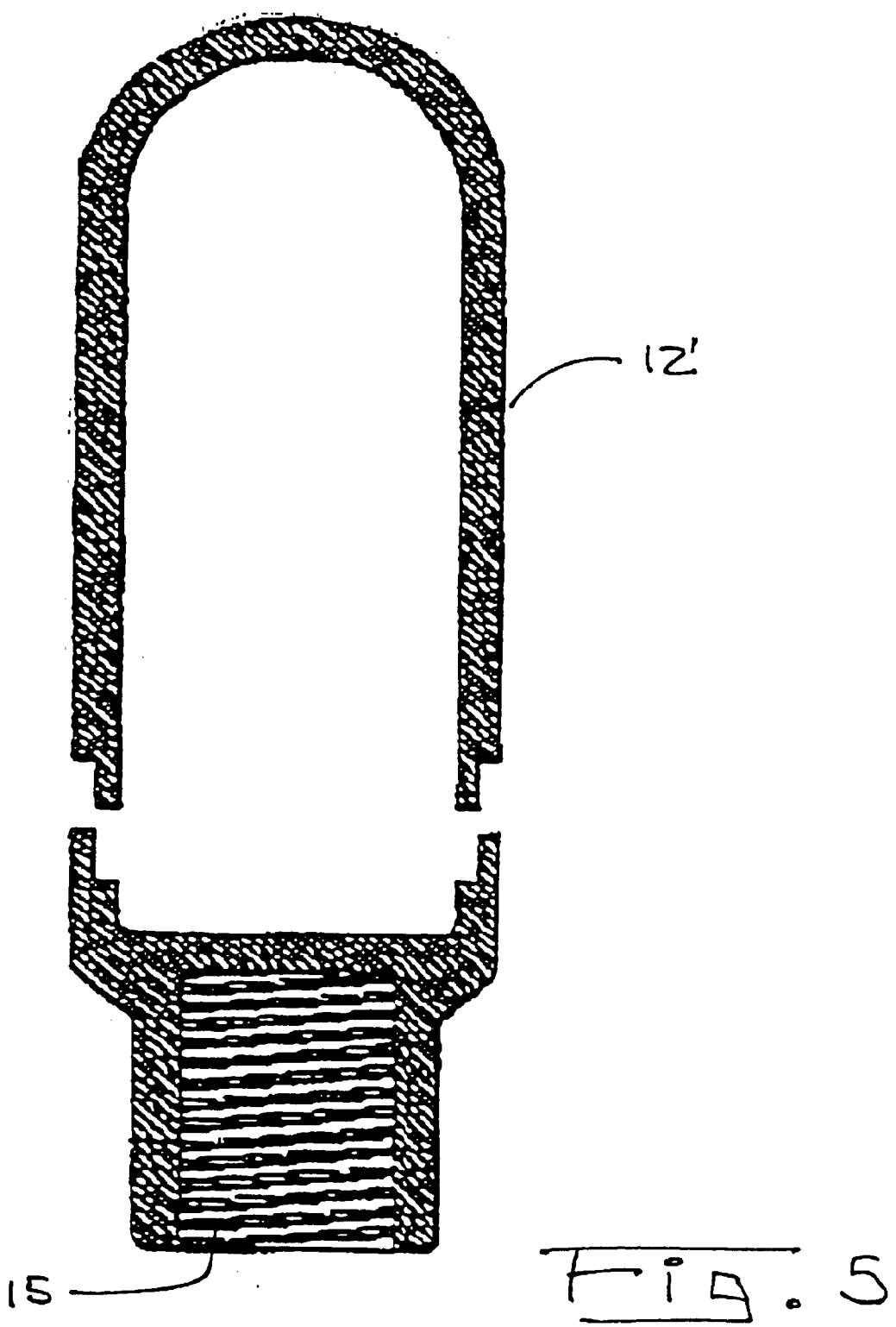
FIG. 5 is a cross sectional view of a housing for the wheel light of FIG. 4.
Figure 6:
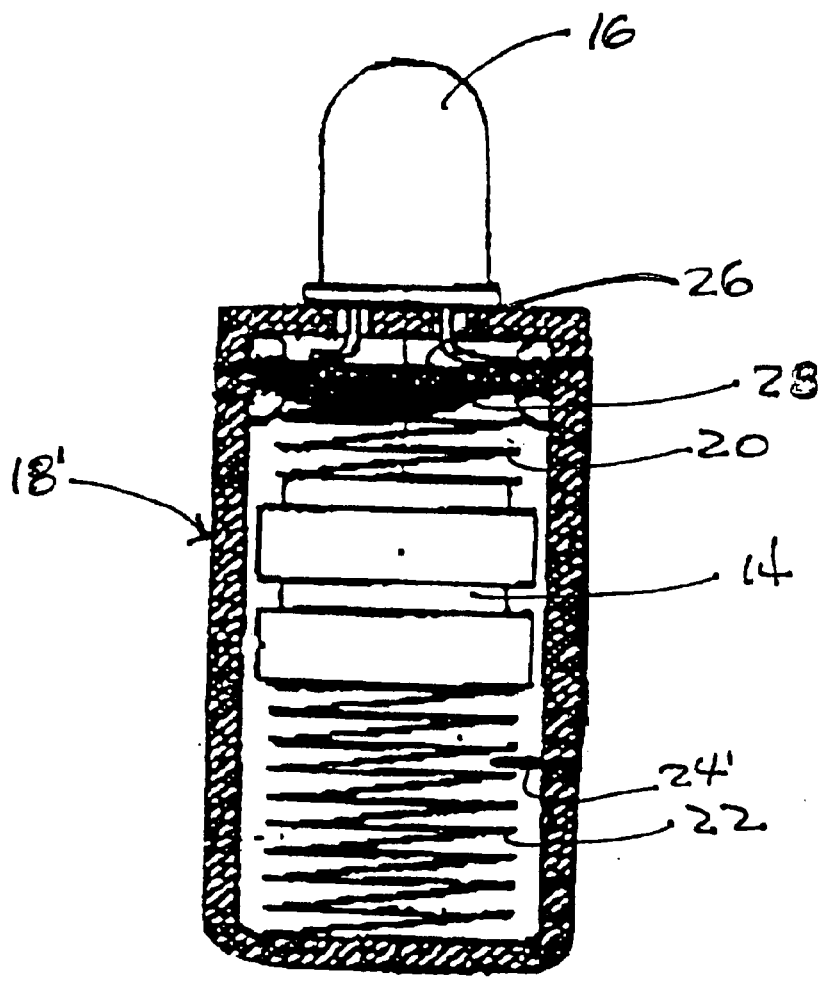
FIG. 6 is a view of the light source, power source and switch of the wheel light shown in FIG. 4.
Figure 7:
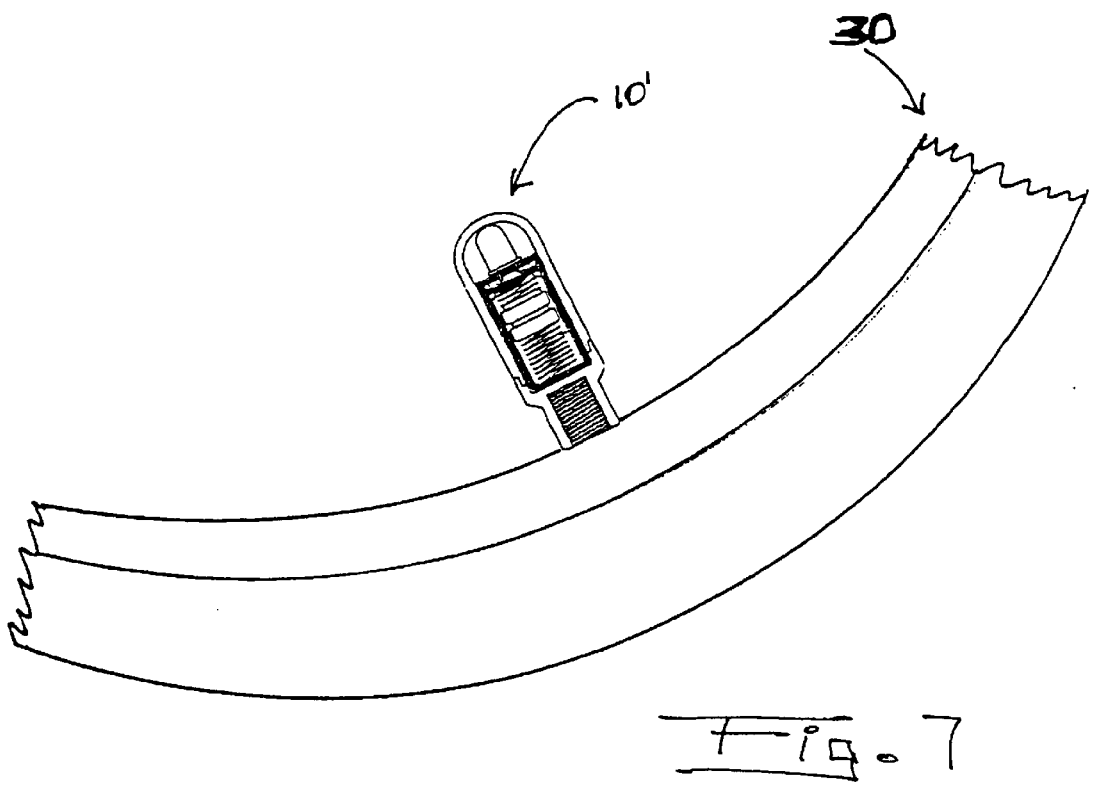
FIG. 7 shows the wheel light of FIG. 4 in place on a vehicle wheel.

FIGS. 1 through 6 illustrate the present invention, a motion activated light 10 originally adapted for connecting to a vehicle wheel having an air valve stem. The light 10 comprises a housing 12, a power source 14, a light source 16, and a motion activated switch 18 connected in a circuit together with the other electrical components. The housing 12, preferred embodiments of which are shown in FIGS. 2–5, serves to enclose the electrical components, including the light source 16 and power source 14. The housing 12 serves to connect the light 10 to the air valve stem of a vehicle wheel, as shown in FIG. 7. The power source 14, at least one battery, but preferably two, is positioned within the housing 12 connected to an electrical circuit, as shown in FIGS. 1, 4 and 6. A light source 16, which those skilled in the art will know may be any suitable light, but preferably a light emitting diode, is positioned within the housing 12 and is connected to the power source 14 through the electrical circuit. A motion activated switch 18 is connected to the power source 14 and to the light source 16 through the electrical circuit so as to close the circuit and energize the light source 16 responsive to movement of the wheel 30, the movement being preferably rotational motion when the vehicle is moving.

The skilled artisan will know that vehicle wheels, particularly in modern vehicles having tubeless pneumatic tires, comprise air valves wherein the valve stem is connected directly to the wheel rim. Alternatively, in a vehicle whose tires include an inner tube, for example, in many bicycles, the air valve stem is part of the inner tube and protrudes from the wheel rim by fitting through an opening therein. The light described herein was originally intended to connect to any such type of air valve stem, whether the pneumatic tire includes an inner tube or not.

Figure 2:
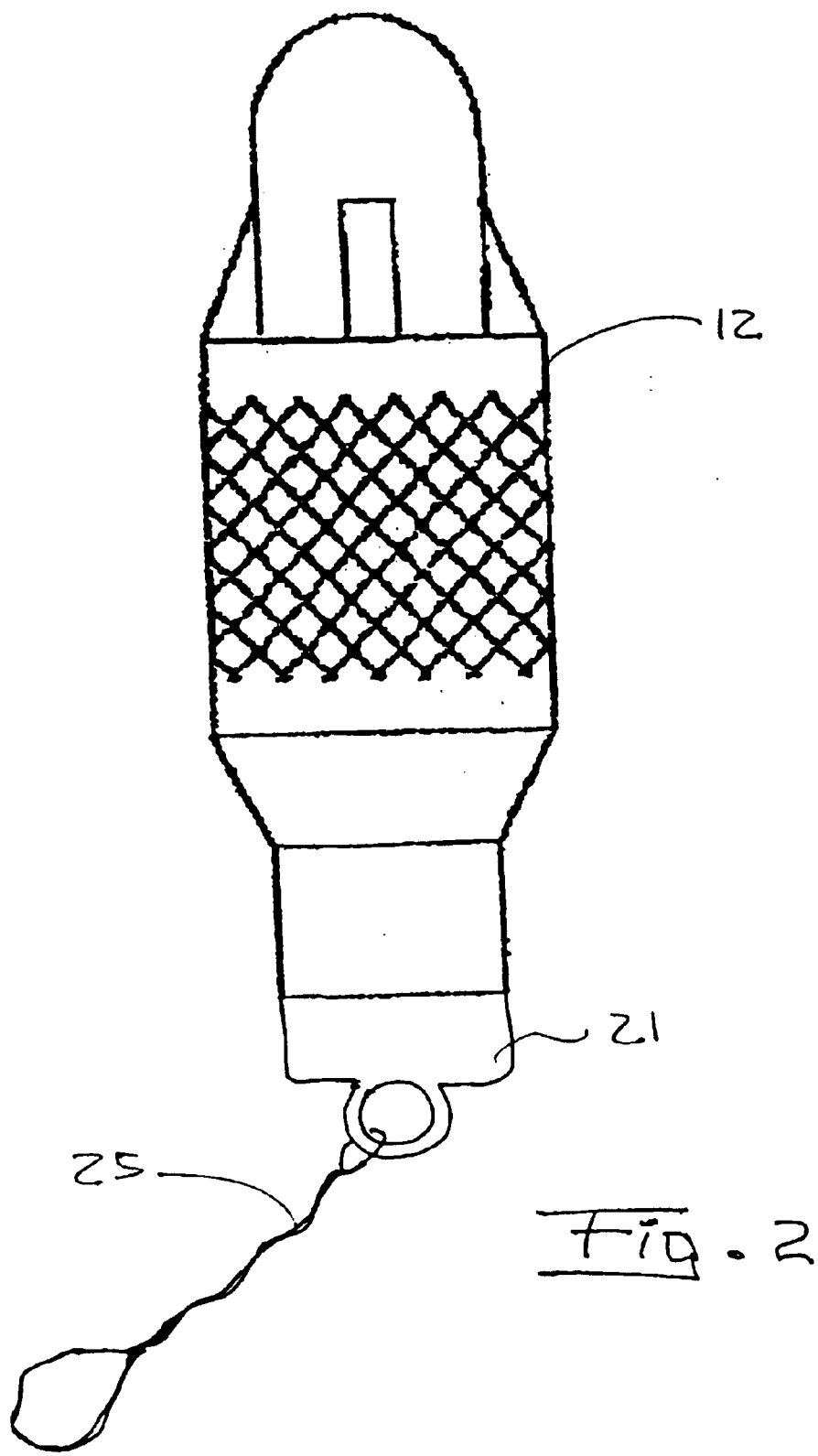
FIG. 2 is a side elevation of the wheel light shown in FIG. 1

The present invention, as shown in FIG. 1, includes the light in combination with an adapter 21 simulating the air valve stem, so as to engage with the light, the adapter also having a connector for connecting said light to a predetermined article other than the vehicle wheel. The skilled will recognize, however, that the light may be manufactured having the adapter as a connector which is an integral part of the light itself, so that the device is ready for connecting to any desired article, rather than to a vehicle wheel. In any embodiment, the adapter/connector may include a device such as a cord 25, as shown in FIG. 2, for hanging the light from an article, or a split ring 23 as commonly employed for key chains and shown in FIG. 1. A cord, as described, could serve to wear the disclosed light as a pendant or necklace.

The housing 12 for the light 10, best shown in FIGS. 2–3 and 5, preferably comprises a translucent or transparent material so as to allow emitted light to shine through the housing 12. In addition, the housing 12 preferably is fabricated from ultrasonically sealed plastic material, thereby comprising a substantially waterproof enclosure for the other components of the wheel light 10. The housing 12 additionally comprises a connector to connect the wheel light 10 to the air valve stem of a vehicle wheel. As shown in FIGS. 3–5 and 7, the housing 12 preferably has threads 15 complementary to those found on a standard air valve stem and connects the light 10 to the wheel by screwing onto the valve stem. Alternatively, the housing 12 may connect to the valve stem substantially by a pressure coupling, or by other methods of connecting as known to those skilled in the art. As illustrated in FIG. 2, the housing 12 may be provided with striations to help scatter light emitted by the light source.

An aspect of the present invention includes the ability to form a visually perceptible image when the light source 16 is energized. For example, the light source 16 itself may comprise an ornamental shape which lights up responsive to motion. To enhance the light image, the light 10 may be configured to emit light in one or more colors. The light source 16 itself may emit colored light, or the housing 12 may comprise material having one or more colors to thereby produce a visually perceptible image in color as the wheel 30 rotates.

Additionally, the light source may preferably be an LED which emits light in the ultraviolet range, and the housing may be fabricated to include a fluorescent composition responsive to the ultraviolet light. The skilled will know that various fluorescent compounds are available which fluoresce in predetermined colors responsive to ultraviolet light. For example, fluorescein isothiocyanate fluoresces in a yellow-green color.

Particularly useful and aesthetic applications of this aspect of the invention include forming emblem images which appear perceptible to the eye as movement begins. The image may advantageously form an advertisement. Such an advertisement may include a team logo, for example, for a professional or school athletic team.

A preferred embodiment of the invention is shown in FIGS. 1–3, although the adapter 21 is shown only in FIG. 1. In this embodiment, the motion sensitive switch 18 comprises a switch contact 24 electrically connected to a pole of the power source 14. The switch contact 24 is positioned suspended adjacent a contact plate 32. Movement of the light 10 causes the switch contact 24 to vibrate sufficiently to touch the contact plate 32, thereby closing the electrical circuit and energizing the light source 16. When movement of wheel light 10 ceases, vibration of the switch contact 24 is reduced and eventually stops, the switch contact moves away from the contact plate 32, and the electrical circuit is opened, turning off the light source 16.

In this embodiment the switch contact 24 is preferably a spring coil formed from a wire which is electrically connected to the lower pole of the power source, as shown in FIG. 1. The vibrational characteristics of switch contact 24 depend on factors known in the art, such as the gauge of wire used to make the spring coil, the number of coils in the spring, the tensile strength of the wire and, therefore, its bendability. Careful control of such characteristics will allow fabrication of a switch contact 24 of predetermined sensitivity to motion, and of predetermined residual contact after motion stops. An integrated circuit 28 positioned on circuit board 26 may also be configured for controlling the rate at which the light source 16 is energized. For example, the integrated circuit 28 can minimize the energizing of the light source 16 due to random movement such as experienced during shipment of the wheel light 10. Additionally, the integrated circuit 28 could be configured to provide a low power use mode responsive to random movement of the wheel light, thereby helping conserve energy in the power source.

Another embodiment of the light 10, as shown in FIG. 6, includes a motion sensitive switch 18 connected to the power source 14 and to the light source 16 to thereby control power flow energizing the light source 16. As illustrated in FIG. 7, the switch 18 is motion activated, and more specifically, is responsive to a centrifugal force generated when the light is moving in a rotational motion. Those skilled in the art will know how to construct a mechanism as shown in FIGS. 4 and 6, comprising a biasing member, preferably a spring, calibrated to respond to an applied force so as to close an electrical contact and energize the light source 16. An embodiment of the switch 18 shown in FIGS. 4 and 6 includes a first biasing member 20, a second biasing member 22, a switch contact 24, and a circuit board 26 having an integrated circuit 28.

Those skilled in the art will realize that the switch 18 preferably comprises a known integrated circuit providing functions related to controlling power flow to the light source 16. For example, the switch 18 may intermittently energize the light source 16 responsive to rotational motion of the vehicle wheel 30 to thereby create visual effects with the emitted light. In addition, intermittent energizing of the light source 16 may be accomplished at predetermined timed intervals to create further light effects. For example, lights 10 having different predetermined energizing intervals could be connected to the different parts of an article, so that each light flashes at asynchronous times relative to the others.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. In combination, a motion activated light for a vehicle wheel having an air valve with a threaded stem, said light comprising:

a housing having threads complementary to the threaded stem for connecting said light to the air valve stem;

a power source connected to an electrical circuit;

a light emitting diode connected to the electrical circuit;

a switch connected to close the electrical circuit responsive to movement so as to energize the light emitting diode; and a threaded adapter simulating the air valve stem and having a connector for connecting said light to a predetermined article other than the vehicle wheel.

2. The light of claim 1, wherein said connector is selected from a split ring, and a cord.

3. The light of claim 1, wherein said predetermined article comprises a zipper pull.

4. The light of claim 1, wherein said housing comprises a substantially waterproof enclosure.

5. The light of claim 1, wherein said housing further comprises an ornamental shape.

6. The light of claim 1, wherein said light emitting diode emits light in the ultraviolet wavelength range.

7. The light of claim 1, wherein said motion sensitive switch intermittently closes said electrical circuit responsive to movement to thereby cause said light emitting diode to emit flashes of light.

8. The light of claim 1, wherein said motion sensitive switch energizes said light source for a predetermined time following cessation of movement.

9. The light of claim 1, wherein said light source comprises an LED which emits ultraviolet light, and wherein said housing includes a fluorescent material responsive to the ultraviolet light.

* * * * *